United States Patent [19]

Brockman

[11] Patent Number: 5,669,788
[45] Date of Patent: Sep. 23, 1997

[54] SCREWLESS TERMINAL BLOCK LINKING APPARATUS

[75] Inventor: David J. Brockman, Cudahy, Wis.

[73] Assignee: Allen-Bradley Company, Inc., Milwaukee, Wis.

[21] Appl. No.: 715,205

[22] Filed: Sep. 18, 1996

[51] Int. Cl.[6] .................................................. H01R 31/08
[52] U.S. Cl. ............................................ 439/511; 439/512
[58] Field of Search .................................. 439/507, 511, 439/512, 49, 513; 361/823, 824

[56] References Cited

U.S. PATENT DOCUMENTS

| 4,030,793 | 6/1977 | Hanlon et al. | 439/511 |
| 4,171,861 | 10/1979 | Hohorst | 439/513 |

FOREIGN PATENT DOCUMENTS

| 2430392 | 1/1976 | Germany | 439/511 |

*Primary Examiner*—Neil Abrams
*Assistant Examiner*—T. C. Patel
*Attorney, Agent, or Firm*—John M. Miller; John J. Horn

[57] ABSTRACT

An apparatus for connecting screwless terminal blocks comprising a screwless jumper link and at least two screwless terminal block center jumpers which may be quickly and easily installed onto a plurality of screwless terminal blocks. The screwless jumper link permits the connection of multiple adjacent screwless center jumpers in series without occupying any terminal block wire terminations, thus maximizing the wire density.

6 Claims, 5 Drawing Sheets

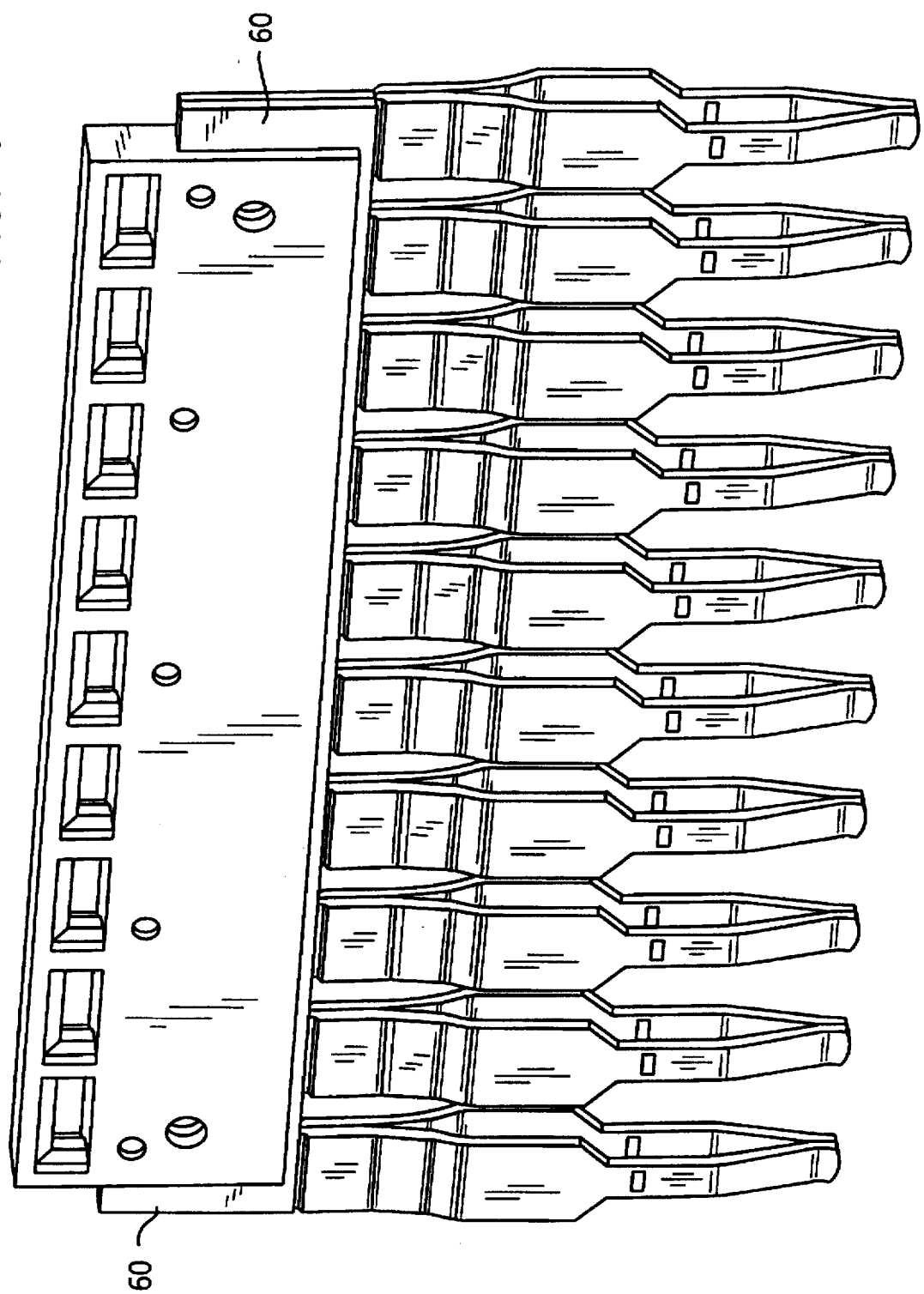

SCREWLESS TERMINAL BLOCK LINKING APPARATUS

Field of Invention

The present invention is related to electrically linking screwless terminal blocks, and, more particularly the invention relates to at least two screwless terminal block jumpers and a screwless jumper link.

Background of the Invention

Screwless terminal blocks used in industrial applications may be connected together via screwless terminal block center jumpers. However, the number of terminal blocks which may be connected together is limited by the number of connections of the center jumper. Presently, when the number of terminal blocks to be electrically connected together exceeds the number of connections of the center jumper, a wire is used to connect adjacent groups of terminal blocks with center jumpers installed. However, a drawback to this approach is that the wire occupies two wire termination points, thereby reducing wire density. Additionally, the time required to cut, strip and bend the jumper wire to the proper configuration is wasted.

In view of such, there is a present need for an apparatus which electrically links an unlimited number of screwless terminal blocks together without occupying any terminal block wire terminations. Moreover, there is a need for an apparatus which quickly and easily electrically links terminal block center jumpers.

Summary of the Invention

The screwless terminal block center jumpers and jumper link of the present invention provide an electrical connection which may be quickly and easily installed onto a plurality of screwless terminal blocks. In particular, the screwless terminal block center jumpers are adapted on their ends to receive a screwless jumper link which permits the connection of multiple adjacent screwless jumpers together by inserting the link over two terminal block center jumper ends. Additionally, no terminal block wire terminations are occupied, thus maximizing the wire density.

It is therefore an object of the present invention to provide an apparatus which electrically links screwless terminal blocks together without occupying any terminal block wire terminations.

It is a further object of the present invention to provide an apparatus which quickly and easily electrically links screwless terminal block center jumpers.

BRIEF DESCRIPTION OF THE DRAWINGS

FIG. 6 is a perspective view of an alternate embodiment of the screwless center jumper.

DETAILED DESCRIPTION OF THE PREFERRED EMBODIMENT

Figure 2:
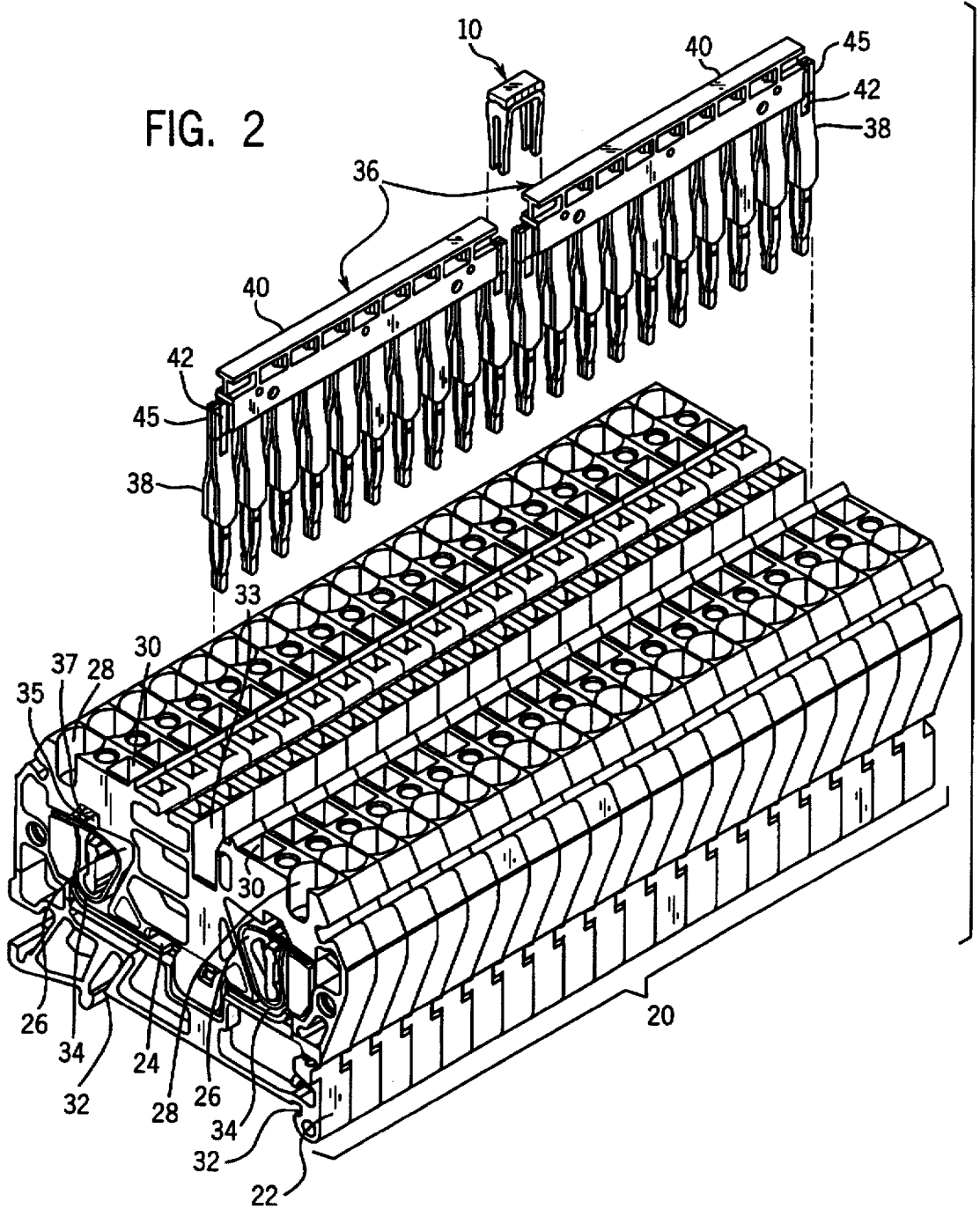
FIG. 2 is an exploded view of a plurality of screwless terminal blocks, screwless terminal block center jumpers and the jumper link in accordance with the preferred embodiment of the present invention.

With reference to FIG. 2 there is shown a plurality of electrical terminal blocks 20 and two screwless terminal block center jumpers 36 and screwless jumper link 10 of the present invention. In general, the screwless terminal blocks 20 comprise a molded plastic housing 22, a copper alloy current bar 24 and spring clamps 26. As shown, both the spring clamps 26 and current bar 24 are fitted within housing 22. The housing 22 also defines wire raceways or conductor pathways 28, channels 30 and 33 and slots 32 for connecting the terminal blocks 20 to a mounting rail.

In use, a screwdriver or similar implement (not shown) is inserted within channel 30 where it is guided along a path extending between the housing 22 and the spring clamp 26. In this manner a force is exerted on the spring 26 causing the spring to bend about its curved portion 34. As a result, the wire retaining aperture 35 translates from its rest position inside the current bar tang 37 to the outside of the current bar tang. Aperture 35 is then aligned with the wire raceway 28 and the wire (not shown) may be fully inserted therein. After proper insertion of the wire, the screwdriver or similar implement is removed from the channel 30 thereby removing the applied force causing the spring clamp 26 to try to return to its original position, thus clamping the wire. In a similar manner a second wire may be inserted within the opposing wire raceway 28 to form an electric circuit from the first wire along the current bar 24 to the opposing second wire.

Figure 3:
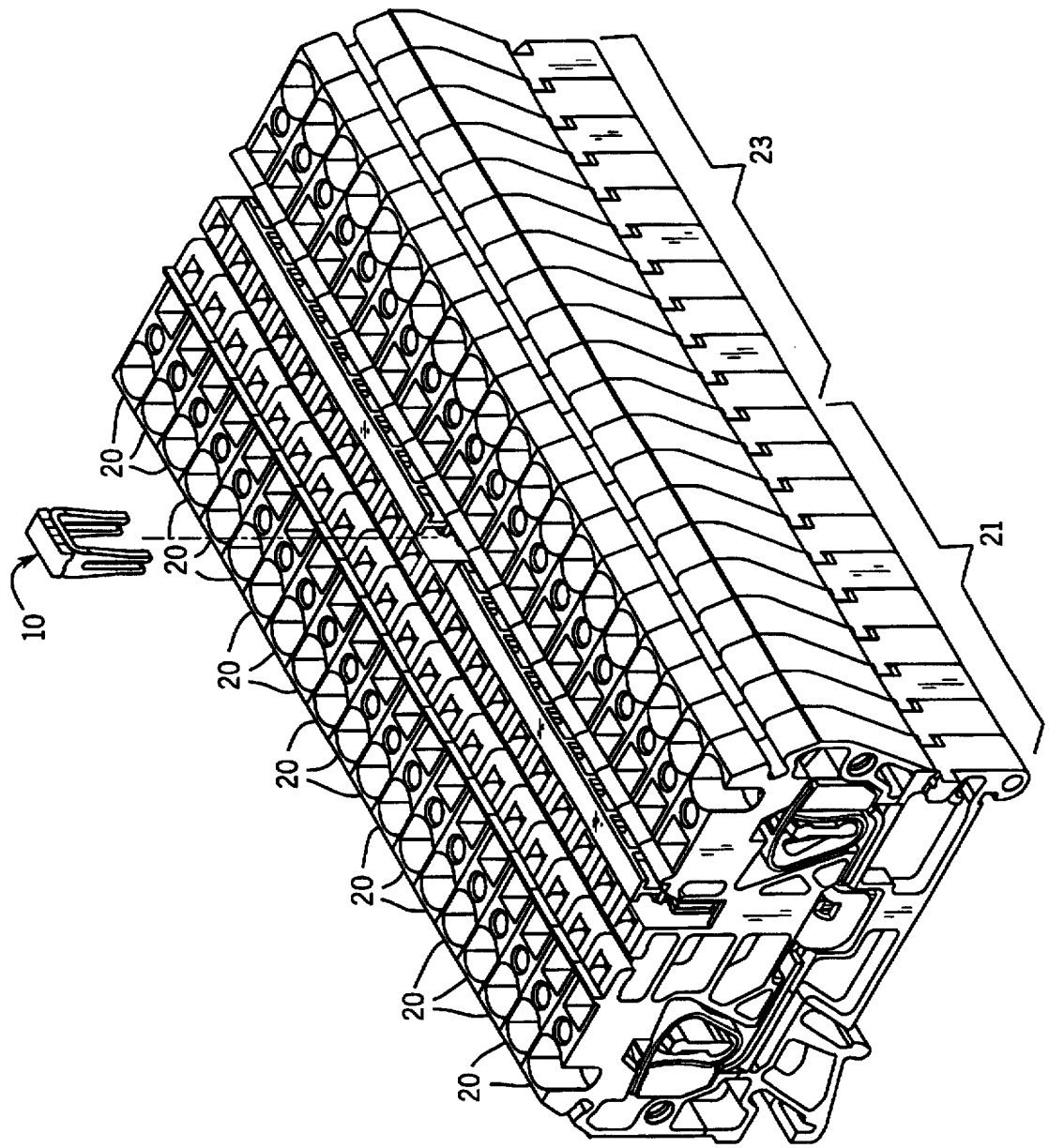
FIG. 3 is a perspective view of the plurality of screwless terminal blocks, installed screwless terminal block center jumpers and the center jumper link in accordance with the preferred embodiment of the present invention.

With further reference to FIG. 2 the plurality of terminal blocks 20 may be linked together via screwless terminal block center jumpers 36 to effectuate a common electrical bus between the bus bars 24 of select groups of the terminal blocks 20. More specifically, the screwless terminal block center jumpers 36 may be inserted into the channels 33 of each of the terminal block groups 21 and 23 as shown in FIG. 3. In the arrangement shown, each terminal block jumper 36 electrically connects the bus bars 24 of ten (10) terminal blocks 20. In the past, when more than ten screwless terminal blocks 20 were required to be connected together a wire (not shown) would be used to electrically connect the plurality of blocks 21 to the plurality of blocks 23. However, this practice tends to be time consuming and decreases wire density as discussed above. In contrast, the terminal block center jumpers 36 of the present invention are configured to accept the screwless center jumper link 10 thereby electrically connecting the center jumpers. With reference FIG. 3, the center jumpers 36 may be connected by the link 10 thereby electrically connecting the bus bars 24 of all twenty of the terminal blocks 20 shown.

Figure 4:
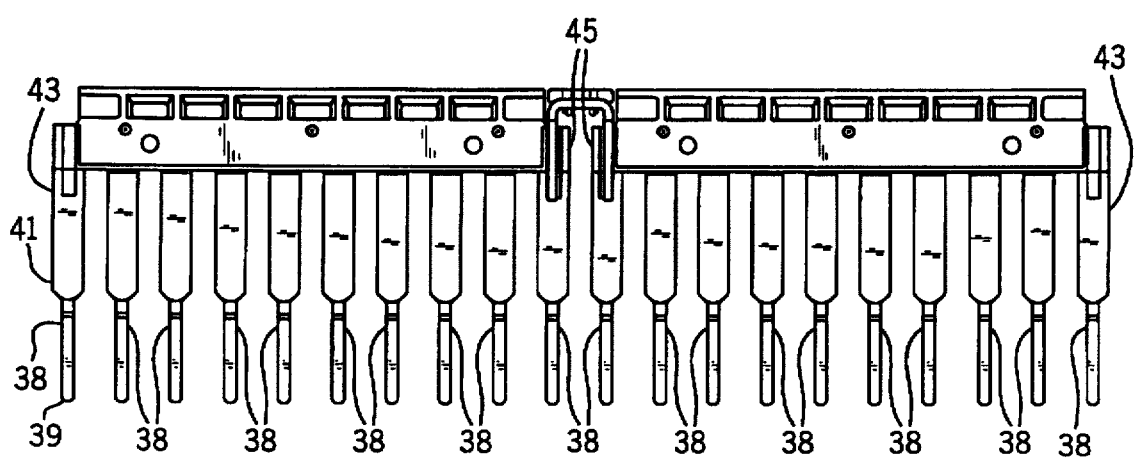
FIG. 4 is a side view of the jumper link installed on a pair of screwless terminal block center jumpers in accordance with the preferred embodiment of the present invention.

With reference to FIG. 4, terminal block center jumpers 36 comprise a plurality of parallel conductive legs 38 connected along their top side to form a conductive body. The conductive legs 38 are separated by a distance corresponding to the spaces between the centers of each bus bar 24 when the terminal blocks 20 are aligned as they would be on a mounting rail as shown in FIGS. 2 and 3. In the preferred embodiment each of the legs 38 comprise a first, contact end 39, a middle compressible portion 41 and a second end 43. As shown, the second ends 43 are physically joined to a conductive body which is covered with an electrically insulated material 40 which covers an otherwise exposed conductive body of the jumper 36 when it is installed in the terminal blocks 20. However, the second ends 43 proximal a first jumper end 45 and a second jumper end 45 are left partially uncovered to receive the jumper link 10.

When inserted into the plurality of terminal blocks 20, the first, contact ends 39 of legs 38 each contact an individual bus bar 24 of the group of the terminal blocks 21 or 23 thereby electrically connecting the bus bars of each of the blocks, respectively. Specifically, as shown in FIG. 3 a first group of terminal blocks 21 is electrically connected by one terminal block center jumper 36 while a second group of terminal blocks 23 is connected by a second terminal block center jumper. In particular, the channel 33 defined by the housing 22 which receives the legs 38 of each jumper is slightly narrower in width than the compressible middle portion 41 of the legs. As a result, the portion 41 is slightly compressed upon insertion into the channel 33 thereby providing resistance against withdrawal from the channel.

Figure 1:
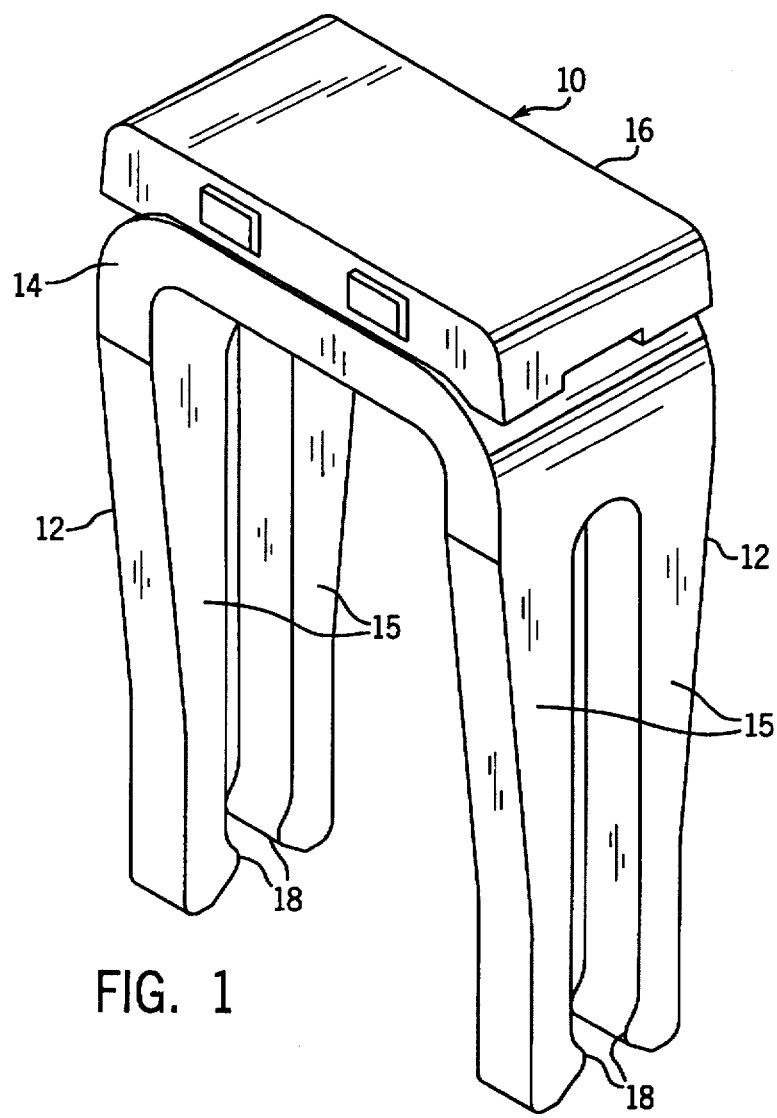
FIG. 1 is a perspective view of a jumper link in accordance with the preferred embodiment of the present invention.

With reference to FIG. 1 the jumper link 10 of the present invention is shown. Link 10 is comprised of a pair of tapered forks 12 connected by a transverse section 14. Each fork 12 is comprised of two tines 15 extending downwardly from the transverse section 14. In the preferred embodiment the tines 15 are tapered towards their ends and have inwardly directed protrusions 18 which bear against the grooves 42 in the ends of the terminal block jumpers 36. Additionally, the transverse section 14 is covered by an insulative material 16 on one side to prevent unwanted contact when the link is in its operational position as shown in FIG. 4.

Figure 5:
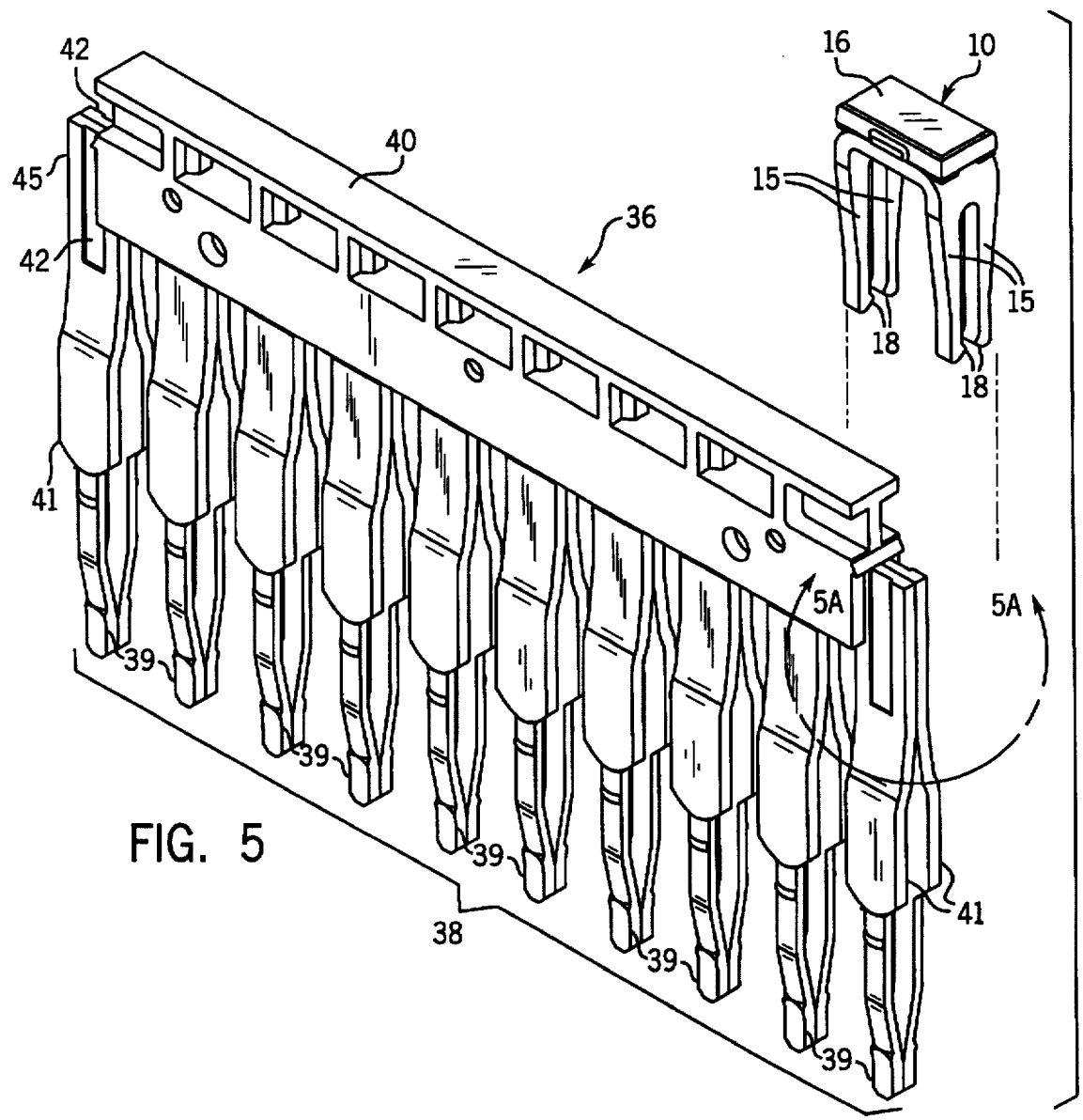
FIG. 5 is a perspective view of a screwless terminal block jumper and detail of the connection point of the jumper link in accordance with the preferred embodiment of the present invention.
Figure 5A:
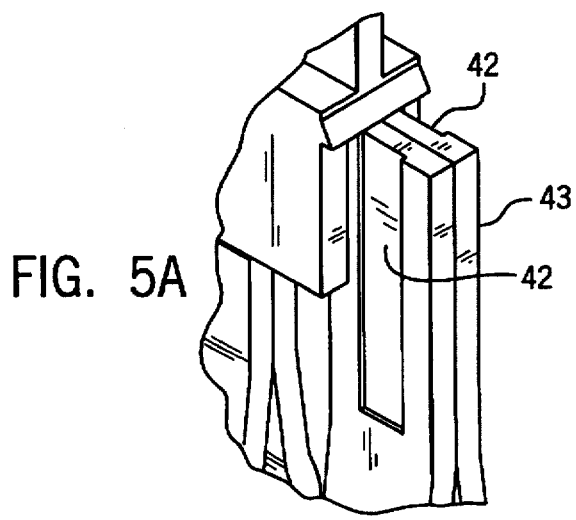
FIG. 5A is an enlarged, detailed view of the area indicated by line 5A—5A on FIG. 5.

FIG. 5 provides a detailed view of an end of the terminal block center jumper 36. As shown, a groove or notch 42 is defined by the center jumper 36 near each of its ends 45. In operation, the tapered forks 15 engage the opposing grooves or recesses 42 to provide a stable connection across the jumpers 36. Although not shown the groove 42 may further include a detent means for engagement with the protrusion 18. In yet another embodiment shown in FIG. 6 the groove 42 may be replaced by a flat surface contact area 60. In this case the tapered forks 15 engage the contact areas 60.

FIG. 4 illustrates the center link 10 engaged on the terminal block center jumpers 36. As shown, the tapered forks 12 of the link straddle a portion of the terminal block jumpers 36 at their ends 45. More specifically, after each of the terminal block center jumpers 36 are inserted within the terminal block groups 21 and 23, the link 10 is pushed down upon the ends 45 of the jumpers. As a result, the protrusions 18 defined by the tines 15 are separated slightly as they engage the grooves 42 at the jumper ends. As the link 10 is further depressed the tapered tines 15 further straddle opposing sides of the jumpers 36. In this manner the tines 15 exert a resistive force against the grooves 42 thereby preventing the link 10 from disengaging the jumpers 36. Accordingly, a removable electrically conductive connection is established across the terminal block jumpers 36. Importantly, none of the terminal block terminations 28 are utilized for electrically connecting the terminal blocks.

While a particular embodiment of the present invention has been shown and described, it should be clear that changes and modifications may be made to such embodiment without departing from the true scope and spirit of the invention. For example, the center link 10 is generally shown as two fork shaped sections and a transverse section, however other shaped links may be employed having a similar effect which do not occupy the terminal block wire termination points. It is intended that the appended claims cover all such changes and modifications and others not specifically mentioned herein.

I claim:

1. An apparatus for connecting a plurality of screwless terminal blocks, each terminal block comprising an insulative housing which substantially encloses a bus bar, the apparatus comprising:

a first screwless terminal block jumper having a first plurality of parallel legs coupled to form a first body, the first body defining a first connection area;

a second screwless terminal block jumper having a second plurality of parallel legs coupled to form a second body, the second body defining a second connection area; and a removable screwless link connecting the first connection area to the second connection area.

2. The apparatus as set forth in claim 1 wherein the first connection area defines a first set of opposing grooves and the second connection area defines a second set of opposing grooves; and the link comprises a first fork, a second fork and a transverse section connecting the first fork and the second fork;

wherein, the first fork is sized to removably engage the first set of opposing grooves and the second fork is sized to removably engage the second set of opposing grooves.

3. The apparatus as set forth in claim 2 wherein:

the first fork defines a first pair of tines;

the second fork defines a second pair of tines; and the first and second pair of tines define protrusions which engage the first set of opposing grooves and the second set of opposing grooves.

4. The apparatus as set forth in claim 1 further comprising:

a first insulative cover attached to a portion of the first shoulder a second insulative cover attached to a portion of the second shoulder.

5. An apparatus for connecting a plurality of screwless terminal blocks, each terminal block comprising an insulated housing which substantially enclose a terminal block bus bar and wire termination clamps, the apparatus comprising:

a first screwless means for connecting a first group of terminal block bus bars, the first means defining a first connection area;

a second screwless means for connecting a second group of terminal block bus bars, the second means defining a second connection area; and a removable screwless link coupled to the first connection area and the second connection area.

6. A method for connecting a plurality of screwless terminal blocks, each screwless terminal block comprising an insulative housing which substantially encloses a bus bar, the method comprising the steps of:

connecting each bus bar from a first group of terminal blocks from the plurality of screwless terminal blocks with a first screwless terminal block jumper;

connecting each bus bar from a second group of screwless terminal blocks from the plurality of terminal blocks with a second screwless terminal block jumper; and connecting the first screwless terminal block jumper to the second screwless terminal block jumper with a screwless link.

* * * * *